United States Patent
Wildenhain et al.

(10) Patent No.: US 7,155,869 B2
(45) Date of Patent: Jan. 2, 2007

(54) FIXING FOR COMPOSITE GLAZING

(75) Inventors: Klaus Wildenhain, Dusseldorf (DE); Ralf Linden, Aachen (DE)

(73) Assignee: Saint-Gobain Glass France, Courbevoie (FR)

( * ) Notice: Subject to any disclaimer, the term of this patent is extended or adjusted under 35 U.S.C. 154(b) by 410 days.

(21) Appl. No.: 10/072,002

(22) Filed: Feb. 12, 2002

(65) Prior Publication Data

US 2002/0112425 A1  Aug. 22, 2002

Related U.S. Application Data

(63) Continuation of application No. PCT/FR00/02253, filed on Aug. 4, 2000.

(30) Foreign Application Priority Data

Aug. 12, 1999 (DE) ............................... 199 38 250

(51) Int. Cl.
   *E04B 2/00* (2006.01)
(52) U.S. Cl. ................. 52/506.05; 52/235; 52/508; 52/512; 403/26; 403/77; 403/78; 403/115; 403/117; 403/135
(58) Field of Classification Search ............ 52/235, 52/506.05, 509, 508, 512, 506.01, 204.66, 52/204.593, 786.1, 786.13, 787.1, 204.591; 403/388, 384, 26, 76, 77, 120, 135, 112–118; 411/379, 537, 380–383, 396
See application file for complete search history.

(56) References Cited

U.S. PATENT DOCUMENTS

| | | | | |
|---|---|---|---|---|
| 5,540,514 A | * | 7/1996 | Demars et al. ............. 403/388 |
| 5,588,421 A | * | 12/1996 | Busch et al. ................ 126/200 |
| 6,131,346 A | * | 10/2000 | Kordes ........................ 52/235 |
| 6,254,397 B1 | * | 7/2001 | Elmer ........................... 439/6 |
| 6,442,911 B1 | * | 9/2002 | Elmer et al. ............. 52/506.01 |
| 6,715,955 B1 | * | 4/2004 | Ginzel ........................ 403/388 |
| 6,735,921 B1 | * | 5/2004 | Oberhofer et al. ......... 52/786.1 |

FOREIGN PATENT DOCUMENTS

| | | |
|---|---|---|
| EP | 0 528 781 A1 | 2/1993 |
| EP | 0 595 062 A1 | 5/1994 |
| EP | 0 682 164 A1 | 11/1995 |
| FR | 2 658 237 | 8/1991 |

\* cited by examiner

*Primary Examiner*—Jeanette E. Chapman
*Assistant Examiner*—Yvonne M. Horton
(74) *Attorney, Agent, or Firm*—Oblon, Spivak, McClelland, Maier & Neustadt, P.C.

(57) ABSTRACT

The invention relates to a fixing element for maintaining a composite glass pane. Glass components are assembled and a fixing element is provided for fixing by force or positive engagement to a support structure. The safety elements form a receiving plane.

14 Claims, 2 Drawing Sheets

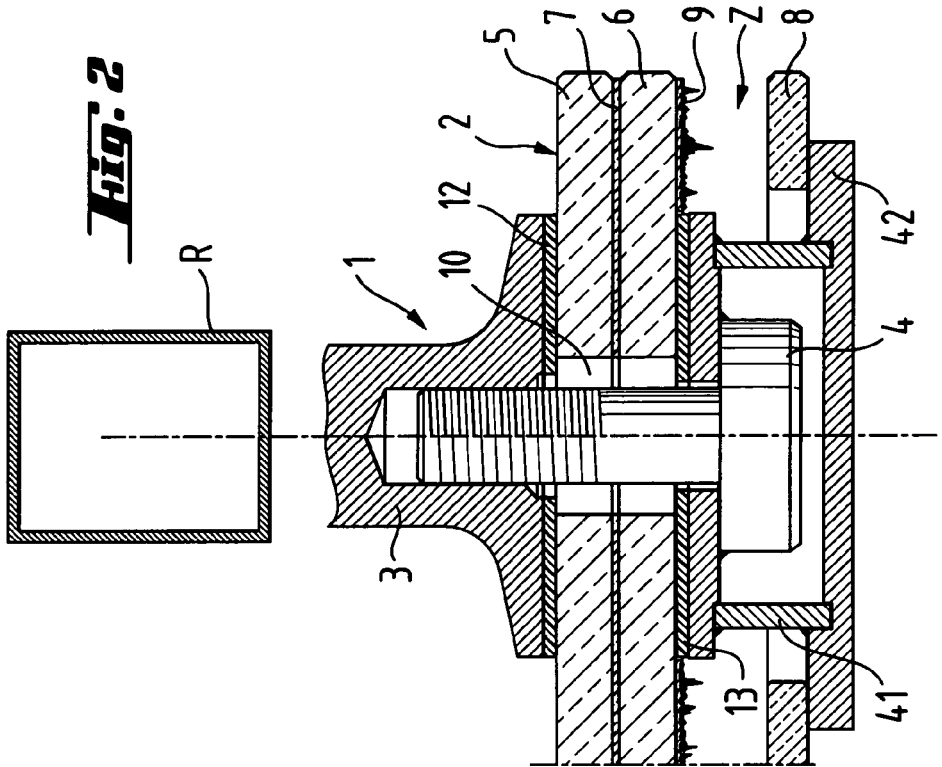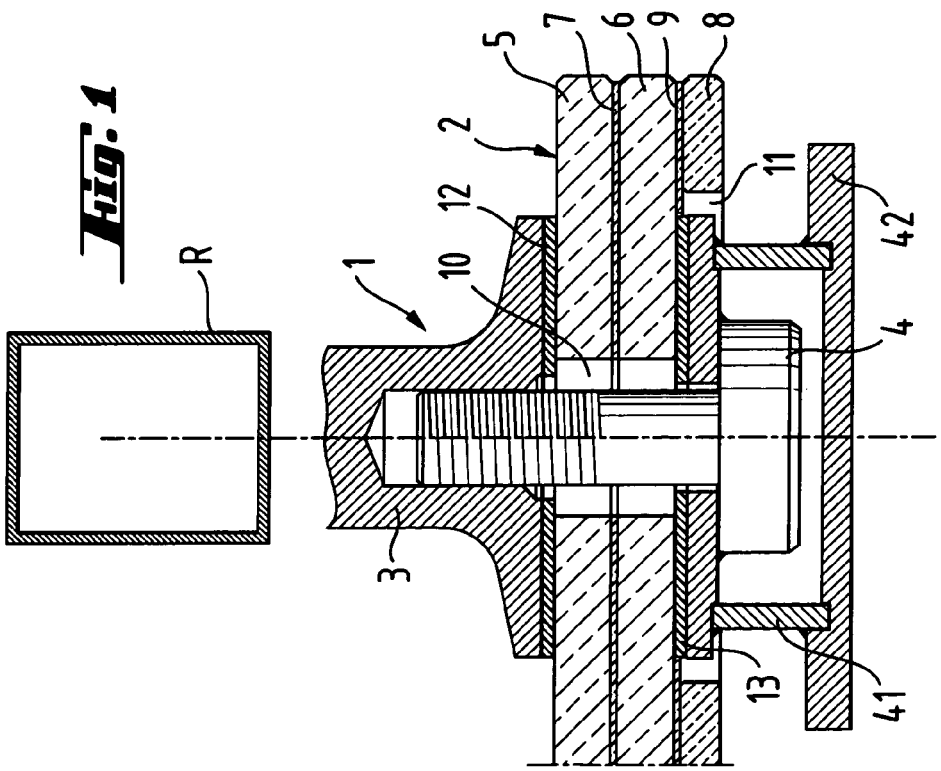

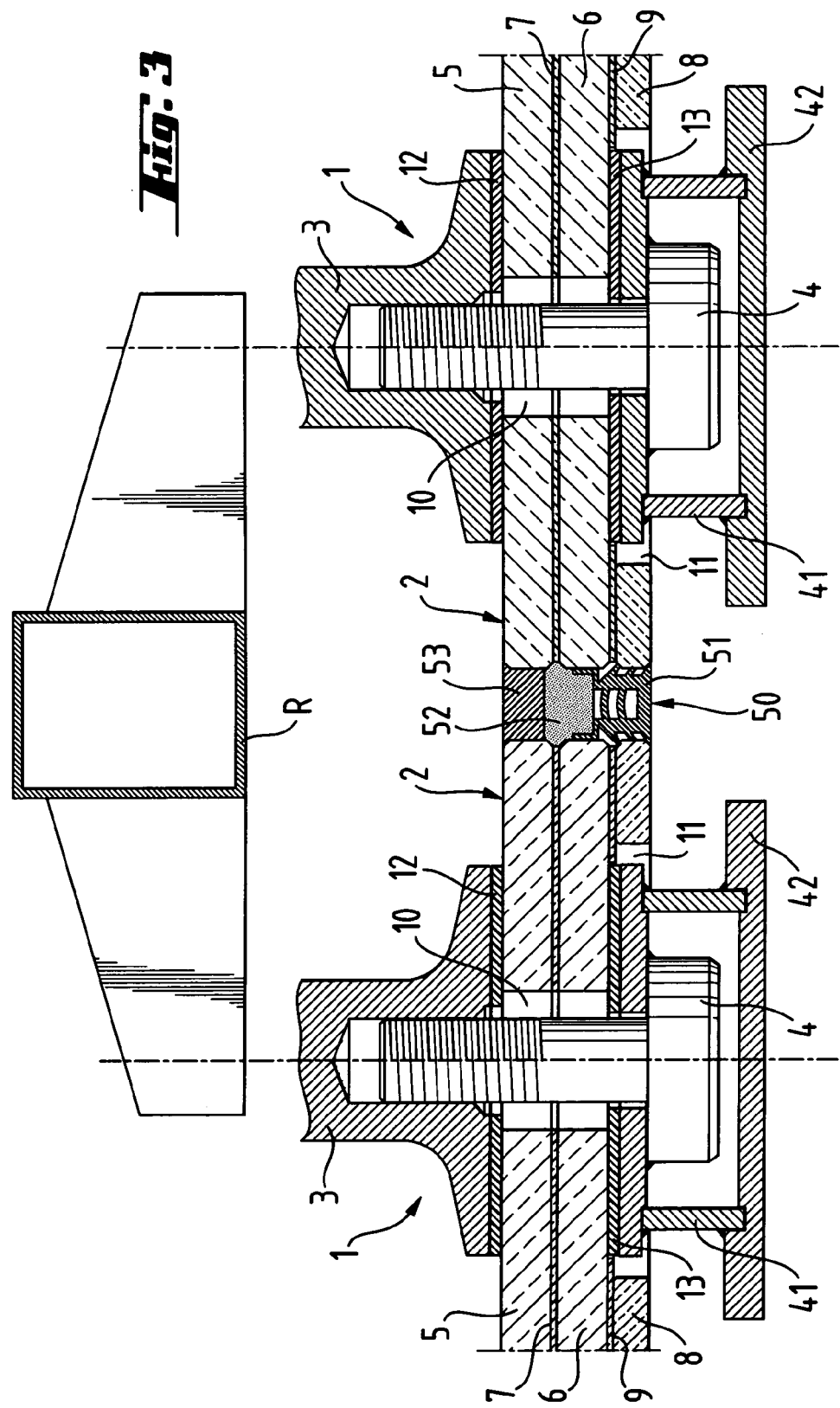

FIXING FOR COMPOSITE GLAZING

CROSS-REFERENCE TO RELATED APPLICATIONS

This application is a continuation of the U.S. National Stage designation of co-pending International Patent Application PCT/FR00/02253, filed Aug. 4, 2000, which claims priority to German Patent Application No. 199 38 250.6, filed Aug. 12, 1999, the entire contents of which are expressly incorporated herein by reference thereto.

FIELD OF THE INVENTION

The invention relates to a fixing for composite glazing.

BACKGROUND OF THE INVENTION

Document EP 0 528 781 discloses protective fire-resistant glazing comprising a glazed element housed in a fixing frame with a prestressed silicate glass pane bonded on top on the fire side, which pane ends a certain distance away from the fixing frame. Arranged on the fixing frame are protruding individual fixing leaves for supporting the additional silicate glass pane and pressing elastically against its main surface. In the event of a fire, the additional pane is supposed to ensure uniform heating and play a part in absorbing the heat energy so that the glazed element behind it resists the fire for longer. To bond the additional pane on, use may be made, for example, of polyvinyl butyral or of some other appropriate organic synthetic material. Under the effect of the heat, the adhesive layer melts, which means that the bond no longer holds. The additional pane is then held in its position only mechanically by the fixing leaves. Because the fixing leaves are mounted at isolated points, there remains no other widespread screen protecting the additional pane, which is therefore heated more or less uniformly, which means that no dangerous temperature differences occur within the glass nor, in consequence, do any dangerous tensions appear therein.

One disadvantage of the fire-resistant glazing described in that publication, with its fixing and with its protection against falling out, lies in the fact that use is made of a frame and of fixing leaves which detract from the visual appearance and make the tasks of cleaning more complicated. The surface of the glazing is also fissured by the seals of the set-back additional pane.

There is a need for an improved fixing for composite glazing used, as a preference, in glazing that affords protection against fire, or fire-resistant glazing.

SUMMARY OF THE INVENTION

The invention relates to a fixing for supporting fire-resistant composite glazing on a subconstruction with the composite glazing formed of an assembly of a glazed element and an additional pane. The fixing includes at least one point support for fixing the glazed element to the subconstruction and at least one safety element. The safety element is configured and dimensioned to permit the additional pane to be disposed in a first position proximate the glazed element and a supported position spaced therefrom. The at least one point support may fix the glazed element by force or positive engagement, and in the first position the additional pane may be bonded to the glazed element. The at least one safety element may be fixed at least indirectly to the glazed element.

The additional pane may have at least one opening through which a support of the at least one safety element passes. The at least one opening may be a through-bore and the at least one safety element may be a ring, disk, ring segment or disk segment, with an outside diameter of the at least one safety element being larger than the through-bore. The additional pane may define a first plane, and the at least one safety element may be fixed to a point support that intersects the first plane. The additional pane may be a monolithic or multilayer fire-resistant pane, and the glazed element may be a pane of laminated glass. In some embodiments, the glazed element is formed from an insulating glazing having at least two sheets of glass assembled with one another by a spacing frame.

The additional pane may be prestressed or partially prestressed, and the additional pane may be formed of at least two sheets assembled with one another. A heat-reflective coating may be provided on the additional pane. The glazed element may be at least one pane formed of prestressed or partially prestressed glass. Also, the composite glazing may be an oblique glazing or roof glazing, and the composite glazing may be at least one of a large-area type and frameless type. An intermediate insulating gap may be formed between the glazed element and the additional pane when the additional pane is in the supported position.

The invention also relates to a fixing for supporting a composite glazing formed of at least one glass element and an additional pane. The fixing includes a support, and a safety element coupled to the support and spaced therefrom to define a region for receiving the at least one glass element. The safety element is configured and dimensioned to permit the additional pane to be disposed in a first position proximate the glass element and a supported position spaced from the first position. In some embodiments, the safety element is coupled to the support with a fastener, and the fastener may be received in aligned bores in the support and safety element.

The invention further relates to a fire-resistant glazing assembly including a support, a safety element coupled to the support and spaced therefrom, a first glass sheet disposed between the support and the safety element, and a second glass sheet. The safety element is configured and dimensioned to permit the second glass sheet to be disposed in a first position proximate the first glass sheet and a second supported position spaced from the first position.

The first glass sheet may have a bore, and the safety element may be coupled to the support with a fastener that extends therethrough. In the first position, the second glass sheet may be bonded to the first glass sheet. Also, the safety element may include a first portion sealed to the first glass sheet and a second portion remote from the first glass sheet. The second glass sheet may include a bore with an inner diameter, the first portion may include a first outer diameter, and the inner diameter may be larger than the first outer diameter. The second portion may have a second outer diameter, and the inner diameter of the bore may be smaller than the second outer diameter.

The first glass sheet may be formed from at least two sheets, and the at least two sheets may be bonded together. The first glass sheet may be a pane of laminated glass. At least one of the first and second glass sheets may be prestressed or partially prestressed, and the first glass sheet may be separated from the support by a seal.

The invention also relates to a fixing for supporting composite glazing made up of a glazed element and of an additional pane assembled therewith, particularly for fire-resistant glazing, on a subconstruction Safety elements are provided for holding the additional pane should its assembly with the glazed element fail. The fixing (1) includes at least one point support (3, 4) fixing the glazed element (5, 7, 6) by force or by positive engagement to the subconstruction, with the safety elements (42) forming a holding plane away from the main free surface of the additional pane (8). The additional pane (8) may be bonded to the glazed element (5, 7, 6), and the safety elements (42) may be fixed at least indirectly to the glazed element (5, 7, 6). The additional pane (8) may have at least one opening (11) through which a support of the safety elements (42) passes. Also, the safety elements (42) may be fixed respectively to a point support (3, 4) passing through the plane of the additional pane (8).

The openings (11) may be through-bores in the additional pane (8), and the safety elements (42) may be designed as rings, disks, ring segments or disk segments with an outside diameter larger than the through-bore. The additional pane (8) may be prestressed or partially prestressed, and may be made up of at least two sheets assembled with one another. The additional pane (8) may be made up of a monolithic or multilayer fire-resistant pane, and the glazed element (5, 7, 6) may be a pane of laminated glass.

The additional pane (8) may be provided with a heat-reflective coating. Further, the glazed element (5, 7, 6) may be insulating glazing consisting of at least two sheets of glass assembled with one another by a spacing frame. The glazed element (5, 7, 6) may include at least one pane made of prestressed or partially prestressed glass.

The fixing may be particularly suited as oblique or roof glazing of the large-area and/or frameless type. In the event of fire, if the assembly (9) between the glazed element (5, 7, 6) and the additional pane (8) fails, the latter pane may be held and retained by the safety elements (42), at the same time forming an intermediate additional insulating gap (Z) from the glazed element (5, 7, 6).

According to the invention, the fixing of the composite glazing comprises, at a subconstruction or substructure, at least one point support, which is connected only to the glazed element, the safety elements enclosing a holding plane which lies a certain distance away from the main free surface of the additional pane. The point supports are usually the fixing elements which are well known in themselves, which engage inside the surface of the composite glass and which are provided with means for compensating for the manufacturing and installation tolerances and with degrees of freedom so as to balance out the internal and external forces exerted on the panes.

The use of such point supports makes it possible to dispense with a frame surrounding the composite glazing or the glazed element. It is thus possible to use an additional pane of the same size as the glazed element. If need be, the additional pane may even protrude from or be set back from one or more edges of the glazed element.

The expression "glazed element" is to be understood as meaning any type of conventional glazing used in building, that is to say that use may be made, by way of glazed element, of laminated glazing, insulating glazing, or even an individual sheet of glass. Within the laminated or insulating glazing, the individual panes may be made of simple float glass or may be prestressed or partially prestressed (toughened). It is also possible to envisage designing individual panes of the laminated or insulating glazing, made of a synthetic material.

As the additional pane is not connected directly to the subconstruction by one or more point supports, it has to be fixed to the glazed element by some other independent means of fixing. A preferred means of fixing is bonding. For example, to assemble the glazed element and the additional pane, use may be made of a film of thermoplastic adhesive, particularly made of polyvinyl butyral. Assembly is then achieved using a conventional method by applying heat and pressure.

By way of additional pane, use may be made of an individual sheet of float glass. For specific applications, however, it is advantageous for the additional pane to be made up of several individual panes joined together. In order to obtain the prescribed strength or to meet specific safety requirements, the pane or panes may be prestressed or partially prestressed. It is also possible to envisage, by way of additional pane, a fire-resistant pane which means that improved resistance to heat is obtained. At the outbreak of a fire, the additional pane absorbs some of the heat energy, reflects some more of it, and thus protects the glazed element fixed to the subconstruction against any unacceptable heating. Should the means of fixing the additional pane and the glazed element together no longer hold as a result of the heating, the additional pane would drop down onto the safety elements which are arranged a certain distance away from the main free surface thereof. This would then result in an additional gap between the fire-resistant pane and the glazed element, which would fill with gas and have an insulating effect against any supply of additional heat. One advantage of such composite glazing provided with a fixing according to the invention is that it indicates failure, in the event of fire, of the bonded assembly by the defined dropping of the additional pane onto the safety elements.

The additional pane may be provided with a heat-reflective coating so as better to protect the sub-construction and/or the glazed element against a heat source and thus protect it from unacceptable heating for a longer period of time. In this particular instance it is sensible to provide the free surface of the additional pane with a heat-reflective coating because this surface faces toward the heat source in the event of fire. Transparent thin layers based on a metal oxide, for example, have proved satisfactory in such applications.

The additional pane may be provided with at least one opening, through which a support for the safety elements extends. The opening may be a circular through-bore, but other shapes such as rectangular or elliptical openings are also possible. The opening may also be provided in principle at the edge of the additional pane.

If there is a desire to fix the safety elements particularly advantageously directly to the point supports, an opening needs to be made in the additional pane in the region of the point support concerned.

The point support may also be fixed through the opening to the glazed element, for example by also providing a bore in the glass window element and by assembling the latter forcibly to the point support using a nut and bolt assembly. In this case, a threaded bolt led onto the point support can be inserted through the bore from the subconstruction side and tightened on the opposite side using a nut on the glazed element. Naturally, the customary resilient mounts and/or seals will be used when mounting glass elements.

The safety elements themselves may be provided directly on the nut, so that these elements enclose the holding plane a certain distance away from the free surface of the additional pane. In the case of a bore by way of an opening in the additional pane, the safety elements are made appropriately of toric seals, disks or ring segments or disk segments with an outside diameter or perimeter in excess of the diameter of the bore. It is also possible to envisage safety elements in the form of lugs or hooks. In another embodiment, the safety elements may be cables or rods, for example made of steel, which extend between two or more point supports.

However, it is not absolutely essential for the safety elements to be fixed only indirectly to the glazed element by means of the point supports; they may in theory also be fixed directly to the glazed element elsewhere independently of the point supports, this being along the edge of the glazed element or along its surface that faces the additional pane.

Fixings according to the invention are suitable, in a use claimed as preferred, for glazing, particularly large-area and/or frameless oblique, overhead or roof glazing, also and specifically in environments where there is a risk of fire.

Finally, also claimed is fire-resistant glazing using the fixings according to the invention, in which, in the event of fire, if the assembly between the glazed element and the additional pane fails, the latter pane is held and retained by the safety elements, at the same time forming an intermediate additional insulating gap from the glazed element.

Other specifics and advantages of the subject of the invention will emerge from the nonlimiting drawing of one exemplary embodiment and from its description as given hereinbelow.

BRIEF DESCRIPTION OF THE DRAWINGS

Preferred features of the present invention are disclosed in the accompanying drawings, wherein similar reference characters denote similar elements throughout the several views, and wherein:

FIG. 1 shows an embodiment of the fixing according to the invention of a composite glazing to a bonded fire-resistant pane by way of an additional pane;

FIG. 2 shows the fixing of the composite pane after failure of the layer of adhesive in the event of fire; and FIG. 3 shows a cross-section of large-area glazing using the fixing according to the invention.

DETAILED DESCRIPTION OF PREFERRED EMBODIMENTS

According to FIG. 1, the fixing 1 for composite glazing 2 is made up of a support 3 and of a tightening screw 4, which form a point support. The composite glazing 2 is produced as fire-resistant glazing, two sheets of partially prestressed float glass 5 and 6 in this case being laminated onto a film of polyvinyl butyral thermoplastic adhesive 7 to form a glazed element in the form of composite glass 5, 7, 6. Bonded to this element by way of an additional pane 8 is another fire-protection pane made of highly prestressed silicate glass, also using a film 9 of polyvinyl butyral adhesive.

The support 3 may, for example, be introduced into and welded in the tube R of a subconstruction illustrated with its free end opposite the composite glazing 2. In this assembly which is illustrated in a very simplified form here, it is also possible to provide the conventional means for compensating for the tolerances and/or the elastic deformations which are due to the external forces and thermal expansions. It is intended that the number of point supports 3, 4 to be used for composite glazing depends on the dimensions and weight of the composite; in general, each piece of composite glazing will require several fixings with the required degrees of freedom.

The fixing 1 is assembled with the laminated glazed element 5, 7, 6 via a clamped connection. For that, there is provided in the laminated pane 5, 7, 6 a bore 10 through which there passes an externally threaded bolt, illustrated diagrammatically here, mounted on the tightening screw 4. This bolt is screwed into a corresponding internal thread, also illustrated schematically, in the support 3. In order for the fixing 1 to engage only with the laminated pane 5, 7, 6, there is a round opening 11 in the additional pane 8, that the tightening screw 4 passes through without contacting the additional pane.

Between the support 3 and the glass sheet 5 and between the tightening screw 4 and the glass sheet 6 there are seals, particularly toric seals 12 and 13. These may, for example, be made of a resilient synthetic material or of a material based on aramid fiber, and their purpose is to hermetically seal the bore 10 and protect the surfaces of the glass sheets 5 and 6 against damage by the tightening forces of the fixing 1. Sealing means prevent the ingress of moisture under normal conditions and ensure airtightness; in the event of fire, the passage of flames and fumes toward the subconstruction also have to be delayed for as long as possible.

A safety element 42 is fixed to the clamping screw 4 with an inserted spacing washer 41, this being on the same side as the additional pane 8. Several of these safety elements form the holding plane spaced away from the free surface of the additional pane 8. The spacing washer 41 acts as a support for the safety element 42 and passes through the plane of the additional pane.

The connections between the clamping screw 4, the spacing washer 41 and the safety element 42, for example, may be made by welding, so that as the screw is screwed in, the safety element 42 is simultaneously installed. The safety element 42 here is produced in the form of a screw of a diameter greater than the diameter of the round opening 11, so that the additional pane 8 is retained if the adhesive film 9 fails. Such a holding plane may, however, also be formed by safety elements in the form of circular rings with corresponding outside diameters, by individual projections directed toward the outside or by hooks on the spacing washer or by clamping cables between two or more spacing washers. If the safety elements are visible from the outside, they may also be used, if need be, as structural elements for the overall visual appearance of glazing with one or more composite glazings, by varying their number, their shape and/or their color.

FIG. 2 illustrates the fixing 1 and the composite glazing 2 after the adhesive film 9 has failed following the action of heat by a fire. At the outbreak of a fire on the side of the additional pane 8 away from the support 1, this additional pane absorbs a large part of the heat energy, it being possible for its entire volume to heat up as the adjacent polyvinyl butyral adhesive film 9 melts (from about 105° C. upward). The bonded assembly between the laminated glass pane 5, 7, 6 and the additional pane 8 lets go, and the additional pane 8 drops onto the safety element 42 mounted about 20 mm away. Failure of the bonded assembly occurs in this instance because of the poor thermal conductivity of the sheets of glass and of the polyvinyl butyral film, at a stage before the laminated glass 5, 7, 6 has yet begun to be exposed to critical temperatures. Moreover, separation of the individual panes 5 and 6 also in the event of any possible softening of the adhesive film 7 is prevented by the joint clamped fastening by means of the point support 3, 4. When the additional pane 8 drops onto the safety element 42, this creates an intermediate space Z filled with gas between the laminated glass pane 5, 7, 6 and the additional pane 8, and this provides further insulation against the application of additional heat to the fixing 1, the subconstruction and the composite glass pane 5, 7, 6. The insulating effect is so good that even after any possible softening of the additional pane 8, the laminated glass pane 5, 7, 6 and its fixing 1 are essentially still not affected by the heat of the fire. Any products of combustion of the adhesive film 9 can escape into the intermediate space Z created and into the space which is on fire without raising the pressure between the panes 6 and 8.

FIG. 3 illustrates a section through large-area glazing with composite glazing of the type mentioned previously, particularly the area of transition between two composite glazings 2 which are fixed and made safe according to the invention, the joint between which is sealed by a sealing device 50. The latter is made up of three individual elements, namely a profiled resilient gasket 51, a non-combustible strip 52 and silicone filler 53.

The profiled resilient gasket 51 may be made of gum, rubber or some similar material and serves to seal the glazing against the surroundings acting from the same side as the additional pane 8. Through a corresponding configuration of the profile of the gasket 51, the latter may be fixed simply by pushing it in flush into the slot. The non-combustible strip 52 made of ceramic, for example a ceramic paper, forms a barrier, in the event of fire, against temperatures such that the silicone filler 53 is protected against any unacceptable heating. The purpose of the silicone filler 53, in the event of fire, is to seal the glazing against the fumes, while under normal conditions of use protecting the non-combustible strip 52 from moisture and dirt entering from the subconstruction side.

A corresponding sealing device may naturally also be used in the region of a connection between walls.

Depending on the circumstances, the adjacent regions of two composite glazings may also be sealed by a single gasket element, for example filling the joints with silicone or with a single push-in profiled gasket.

While various descriptions of the present invention are described above, it should be understood that the various features can be used singly or in any combination thereof. Therefore, this invention is not to be limited to only the specifically preferred embodiments depicted herein.

Further, it should be understood that variations and modifications within the spirit and scope of the invention may occur to those skilled in the art to which the invention pertains. Accordingly, all expedient modifications readily attainable by one versed in the art from the disclosure set forth herein that are within the scope and spirit of the present invention are to be included as further embodiments of the present invention. The scope of the present invention is accordingly defined as set forth in the appended claims.

What is claimed is:

1. A fire-resistant glazing assembly comprising:
   first and second panes, the first pane positionable between a first position adjacent the second pane and a second position apart from the second pane;
   a support member; and
   a safety member cooperatively fastened with the support member such that at least a portion of each of the first and second panes is disposed therebetween, the safety member comprising first and second contacting members, the first contacting member contacting the second pane and the second contacting member being out of contact with the first pane when the first pane is in the first position and contacting the first pane when the first pane is in the second position.

2. The fire-resistant glazing assembly of claim 1, wherein the second pane comprises a second pane bore, and the safety member comprises a fastener extending through the second pane bore to cooperatively fasten with the support member.

3. The fire-resistant glazing assembly of claim 2, further comprising:
   an adhesive disposed between the first and second panes.

4. The fire-resistant glazing assembly of claim 1, wherein the first contacting member is adhered to the second pane.

5. The fire-resistant glazing assembly of claim 2, wherein the second pane bore has a diameter less than a diameter of a first pane bore of the first pane through which a fastener extends.

6. The fire-resistant glazing assembly of claim 5, further comprising:
   a third pane disposed adjacent the second pane, the third pane comprising a third pane bore through which the fastener extends, the third pane bore having a diameter less than the diameter of the first pane bore.

7. The fire-resistant glazing assembly of claim 1, wherein at least one of the first and second panes comprises a glass pane.

8. The fire-resistant glazing assembly of claim 7, wherein the first pane is adhered to the second pane.

9. The fire-resistant glazing assembly of claim 1, wherein the first and second panes are laminated with one another.

10. The fire-resistant glazing assembly of claim 1, wherein at least one of the first and second panes comprises an at least partially prestressed pane.

11. The fire-resistant glazing assembly of claim 1, further comprising:
    a seal disposed between the first contacting member and the second pane.

12. The fire-resistant glazing assembly of claim 2, wherein the safety member comprises at least one of a ring, disk, ring segment and disk segment having an outside larger than a diameter of a first pane bore of the first pane through which the fastener extends.

13. The fire-resistant glazing assembly of claim 2, wherein the safety member is screwed on the support member.

14. The fire-resistant glazing assembly of claim 1, further comprising:
    a third pane adhered by a layer of adhesive to the second pane.

* * * * *